United States Patent
Fahlgren et al.

(10) Patent No.: US 9,484,621 B2
(45) Date of Patent: Nov. 1, 2016

(54) PORTABLE ELECTRONIC DEVICE BODY HAVING LASER PERFORATION APERTURES AND ASSOCIATED FABRICATION METHOD

(71) Applicant: Nokia Technologies Oy, Espoo (FI)

(72) Inventors: Anton Fahlgren, San Francisco, CA (US); Harri Lasarov, Sunnyvale, CA (US); Sung-Hoon Oh, Cupertino, CA (US); Axel E. Meyer, Sunnyvale, CA (US); Ville Henrikki Vehkapera, Cupertino, CA (US); Janne H. Rautio, Sunnyvale, CA (US); Mika Nenonen, Sunnyvale, CA (US); Nicolas Lylyk, Palo Alto, CA (US)

(73) Assignee: Nokia Technologies Oy, Espoo (FI)

( * ) Notice: Subject to any disclaimer, the term of this patent is extended or adjusted under 35 U.S.C. 154(b) by 329 days.

(21) Appl. No.: 13/667,366

(22) Filed: Nov. 2, 2012

(65) Prior Publication Data

US 2014/0126172 A1    May 8, 2014

(51) Int. Cl.
   *G06K 19/06*     (2006.01)
   *H01Q 1/24*     (2006.01)
   (Continued)

(52) U.S. Cl.
   CPC ............ *H01Q 1/243* (2013.01); *B23K 26/382* (2015.10); *H01Q 9/42* (2013.01); *H04M 1/0202* (2013.01); *B23K 2201/38* (2013.01); *H04M 1/026* (2013.01)

(58) Field of Classification Search
CPC .. G06K 19/06; G06K 5/00; G06K 19/07745; G06K 19/07749; G06K 19/07752; G06K 19/07756; G06F 17/00; H05K 5/00; H05K 7/00; H05K 7/04; H05K 1/18

USPC ................. 235/492, 375, 380, 451
See application file for complete search history.

(56) References Cited

U.S. PATENT DOCUMENTS 8,072,333 B2 * 12/2011 Ferguson et al. .......... 340/572.7
8,150,484 B2   4/2012 Laurent et al.
(Continued)

FOREIGN PATENT DOCUMENTS

DE    20 2010 014774 U1    1/2012
JP       2004-244669 A      9/2004
(Continued)

OTHER PUBLICATIONS

International Search Report and Written Opinion for Application No. PCT/FI2013/051034; dated Jan. 7, 2014.
(Continued)

*Primary Examiner* — Edwyn Labaze
(74) *Attorney, Agent, or Firm* — Alston & Bird LLP

(57) ABSTRACT

A method of fabricating the body of the portable electronic device as well as the resulting portable electronic device and its body are provided to facilitate the transmission of radio frequency signals through the body of the portable electronic device. In the context of a method, at least one aperture and, in some instances, a plurality of apertures are defined by laser perforation through a conductive portion of the body of the portable electronic device. The method may also anodize the conductive portion including at least partially filling the at least one aperture with an anodization layer. As such, the conductive portion of the body of the portable electronic device has a relatively consistent, metallic appearance, even though laser perforation apertures are defined therein for supporting the transmission of radio frequency signals.

25 Claims, 11 Drawing Sheets

(51) Int. Cl.
*H01Q 9/42* (2006.01)
*H04M 1/02* (2006.01)

(56) References Cited

U.S. PATENT DOCUMENTS

| | | | |
|---|---|---|---|
| 2006/0093262 A1* | 5/2006 | Matsumoto et al. | 385/31 |
| 2008/0008890 A1 | 1/2008 | Li | |
| 2009/0091879 A1 | 4/2009 | Lim | |
| 2009/0153409 A1 | 6/2009 | Chiang et al. | |
| 2009/0256757 A1 | 10/2009 | Chiang et al. | |
| 2009/0279162 A1* | 11/2009 | Chui | 359/290 |
| 2010/0149751 A1 | 6/2010 | Camacho et al. | |
| 2010/0255274 A1* | 10/2010 | Mirsky et al. | 428/209 |
| 2011/0314668 A1* | 12/2011 | Ito et al. | 29/837 |
| 2012/0256224 A1* | 10/2012 | Hatanaka et al. | 257/98 |

FOREIGN PATENT DOCUMENTS

| | | |
|---|---|---|
| JP | 2011-192956 A | 9/2011 |
| KR | 10-2012-0109573 | 10/2012 |
| WO | WO-2007/011865 A2 | 1/2007 |

OTHER PUBLICATIONS

Office Action issued in Korean Application No. KR 9-5-2016-026467840 dated Apr. 12, 2016, 6 pages.

Extended European Search Report from corresponding European Patent Application No. 13851522.6 dated Jul. 25, 2016.

Office Action from Japanese Patent Application No. 2015-540187 dated Aug. 5, 2016.

* cited by examiner

PORTABLE ELECTRONIC DEVICE BODY HAVING LASER PERFORATION APERTURES AND ASSOCIATED FABRICATION METHOD

TECHNOLOGICAL FIELD

An example embodiment relates generally to the body of a portable electronic device and, more particularly, to the body of a portable electronic device having one or more laser perforation apertures for facilitating the transmission of radio frequency (RF) signals through the body.

BACKGROUND

The body of a portable electronic device, such as a cellular telephone, a laptop computer, a tablet computer, a personal digital assistant (PDA) or the like may include one or more conductive or metal parts and one or more plastic parts. For example, a polyphenylene sulfide (PPS) part may be insert molded or overmolded to an aluminum part to form the body of a portable electronic device. Although it may be desirable to form the entire body of a portable electronic device from metal such that the body is both strong and has a consistent and aesthetic appearance, many portable electronic devices are configured in such a manner as to require the body to include some combination of plastic and metal parts. For example, a portable electronic device may include one or more antennas disposed within the body. In order to permit the transmission of the RF signals to and from the antennas, the portion of the body that is aligned with the antennas may be formed of plastic.

The inclusion of plastic parts within the body of a portable electronic device may introduce a number of issues. From an aesthetic standpoint, the plastic part may appear different than the metal part, thereby potentially reducing the attractiveness of the portable electronic device. For example, the plastic part may form a stripe, seam or window between metal parts of the body of the portable electronic device. Such a seam may be undesirable in some instances in which a seamless body is aesthetically preferable. Further, the surface of the plastic part may be softer than the surface of the metal part with this difference in the feel of a plastic part relative to a metal part being potentially disconcerting to the user of the portable electronic device.

To reduce the likelihood that a softer plastic part will be scratched, the plastic part may be coated separate from the metal part, such as by painting or the application of a hard coating to the plastic part, prior to combination with the metal part. As a result, the plastic parts and the metal parts may exhibit a color difference and/or the plastic parts and the metal parts may not be perfectly aligned with one another such that there is a step or an offset between the plastic and metal parts, thereby detracting from the aesthetic appeal of the body of the portable electronic device.

A non-conductive vapor metallization (NCVM) coating may be applied to the body of a portable electronic device having both plastic and metal parts so as to provide a metallic appearance to the plastic parts, thereby creating a more uniform and seamless appearance. However, the NCVM-coated plastic parts will still have a different tactile feeling than the metal parts and, in instances in which a top coat is been applied to the NCVM-coated plastic parts, the visual appearance of the plastic parts may no longer be metallic, that is, the plastic parts may no longer have a consistent appearance with the metal parts. Further, the surface hardness of an NCVM coating is less than that of metal; thereby potentially leading to increased wear of the NCVM coated plastic part which may, in turn, further increase the visual differences between the metal and plastic parts such that the resulting body of the portable electronic device eventually becomes less attractive.

BRIEF SUMMARY

A method of fabricating the body of an apparatus, such as a portable electronic device, as well as the resulting portable electronic device and its body are provided according to embodiments of the present invention in order to facilitate the transmission of radio frequency signals through the body of the portable electronic device. In this regard, apertures are defined by laser perforation through at least a portion of the body of the portable electronic device that facilitate the transmission of radio frequency signals through the body in accordance with an example embodiment to the present invention. Thus, the portable electronic device may include an antenna within the body, but the body of the portable electronic device may be fabricated in a manner that causes the body to have a uniform metallic appearance, while still permitting radio frequency signals to be transmitted therethrough.

In one embodiment, a method is provided that defines at least one aperture and, in some embodiments, a plurality of apertures by laser perforation through a conductive, e.g., metallic, portion of the body of the portable electronic device. In some example embodiments the at least one aperture may be at least one of a slot, a hole, a notch or a slit. For example, the at least one aperture may be a slot that is defined by laser perforation and may be in alignment with an antenna of the portable electronic device so as to facilitate the transmission of radio frequency signals to and from the antenna. The slot provides complete electrical galvanic isolation between two adjacent conductive portions of the body of the portable electronic device. The method of this embodiment also anodizes the conductive portion including at least partially filling the at least one aperture with an anodization layer. As such, the conductive portion of the body of the portable electronic device has a relatively consistent, metallic appearance, even though laser perforation apertures are defined therein for supporting the transmission of radio frequency signals.

The method of one embodiment also includes overmolding the at least one aperture with at least one of a plastic, resin or adhesive so as to fill the at least one aperture following the anodizing. The conductive portion of the body of the portable electronic device may include at least one flange and, as such, the method of one embodiment may include removing the at least one flange following the anodizing. The conductive portion of the body of the portable electronic device of one embodiment may include a conductive layer supported by a plastic carrier. As such, the definition of the at least one aperture by laser perforation may include the definition of a mesh comprised of a plurality of apertures within the conductive layer by laser perforation. In this embodiment, the method may also include forming a plastic part on the conductive layer opposite the plastic carrier such that the plastic part at least partially fills the mesh and thereafter removing the plastic carrier.

In another embodiment, the body of an apparatus, such as a portable electronic device, is provided that includes a conductive portion having at least one laser perforation aperture and, in some embodiments, a plurality of laser perforation apertures defined therein. In this regard, the at least one laser perforation aperture may be in alignment with an antenna of the portable electronic device. The body of the portable electronic device of this embodiment also includes an anodization layer that at least partially fills the at least one laser perforation aperture.

The body of the portable electronic device of one embodiment may also include an overmolded material on the conductive portion opposite the anodization layer that fills the at least one laser perforation aperture. The overmolded material may include a plastic, resin or adhesive. The conductive portion of the body of the portable electronic device may include at least one flange extending beyond the at least one laser perforation aperture. The body of the portable electronic device of one embodiment may also include a plastic carrier. In this embodiment, the conductive portion may include a metal layer supported by the plastic carrier and defining a mesh comprised of a plurality of laser perforation apertures. The body of the portable electronic device of this embodiment may also include a plastic part on the conductive layer opposite the plastic carrier with the plastic part at least partially filling the mesh.

In a further embodiment, a portable electronic device is provided that includes at least a portion of a housing including a conductive portion having at least one laser perforation aperture defined therein and an anodization layer that at least partially fills the at least one laser perforation aperture. In one embodiment, the conductive portion defines a plurality of laser perforation apertures. The portable electronic device of this embodiment also includes electronic circuitry disposed at least partially within the housing. The electronic circuitry may include an antenna aligned with the at least one laser perforation aperture.

The housing of one embodiment may include an overmolded material on the conductive portion opposite the anodization layer that fills the at least one aperture. The overmolded material may include a plastic, resin or adhesive. The overmolded material may define one or more internal features. The conductive portion of one embodiment may include a conductive layer defining a mesh comprised of a plurality of laser perforation apertures.

BRIEF DESCRIPTION OF THE DRAWINGS

Figure 1:
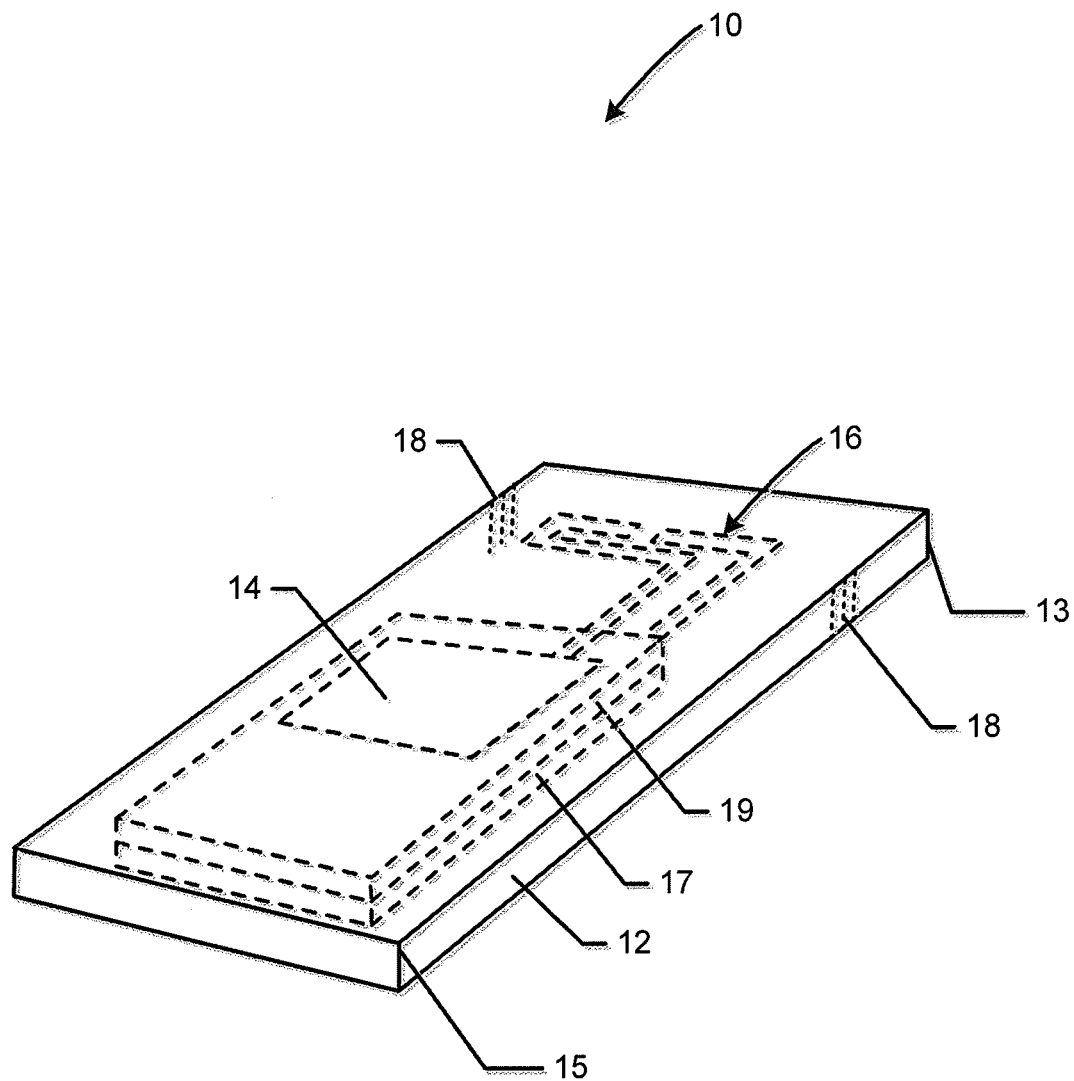
Figure 2:
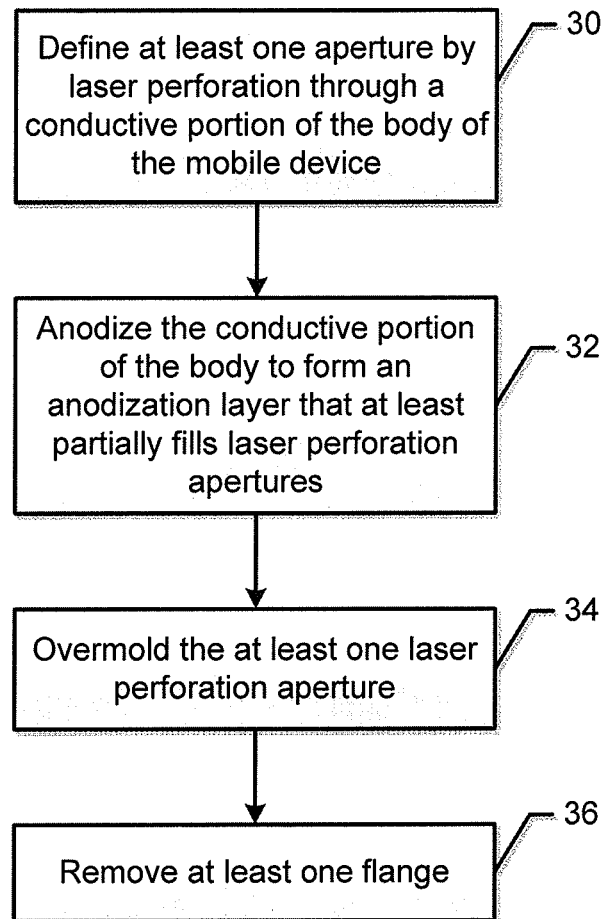
Figure 3:
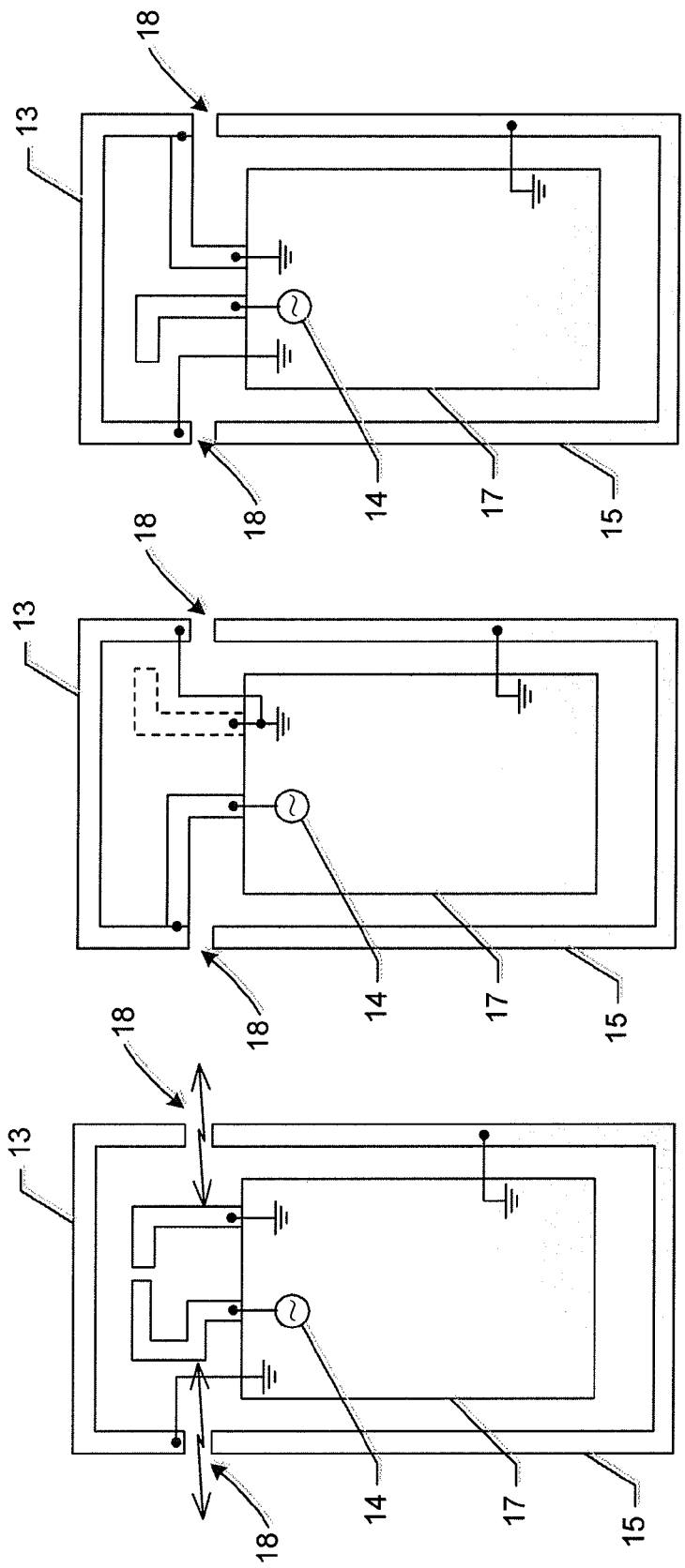
Figure 4:
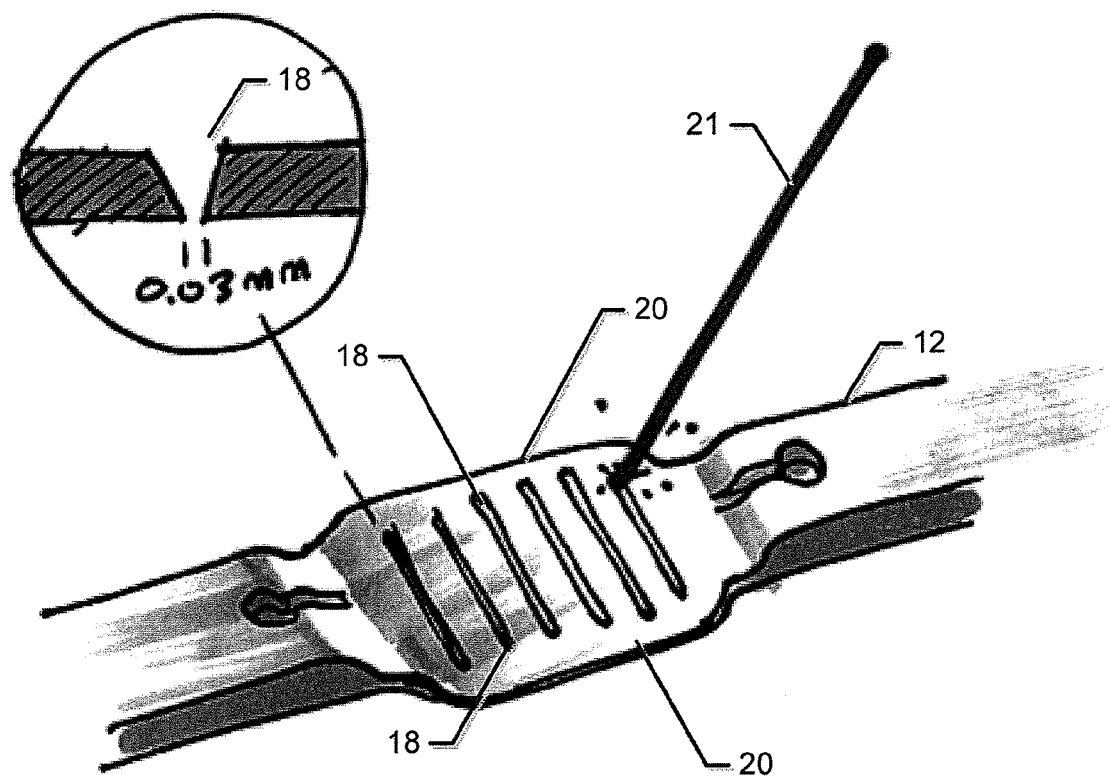
Figure 5:
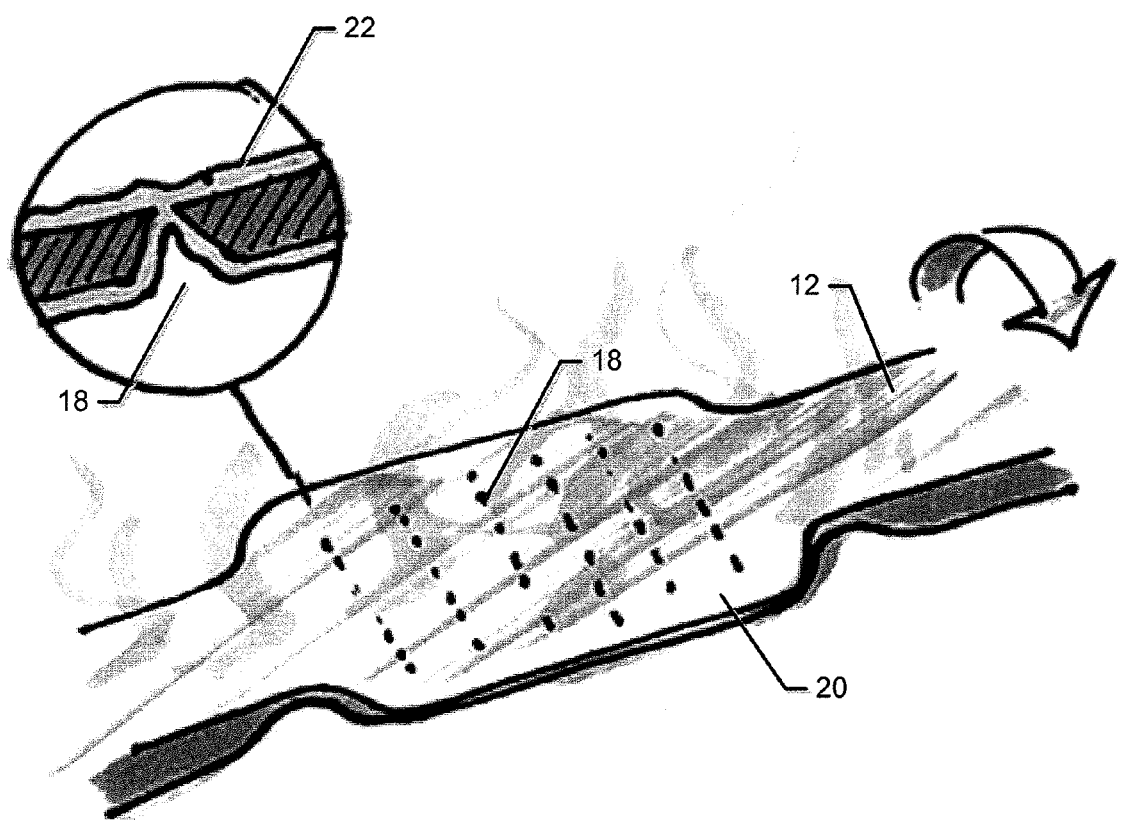
Figure 6:
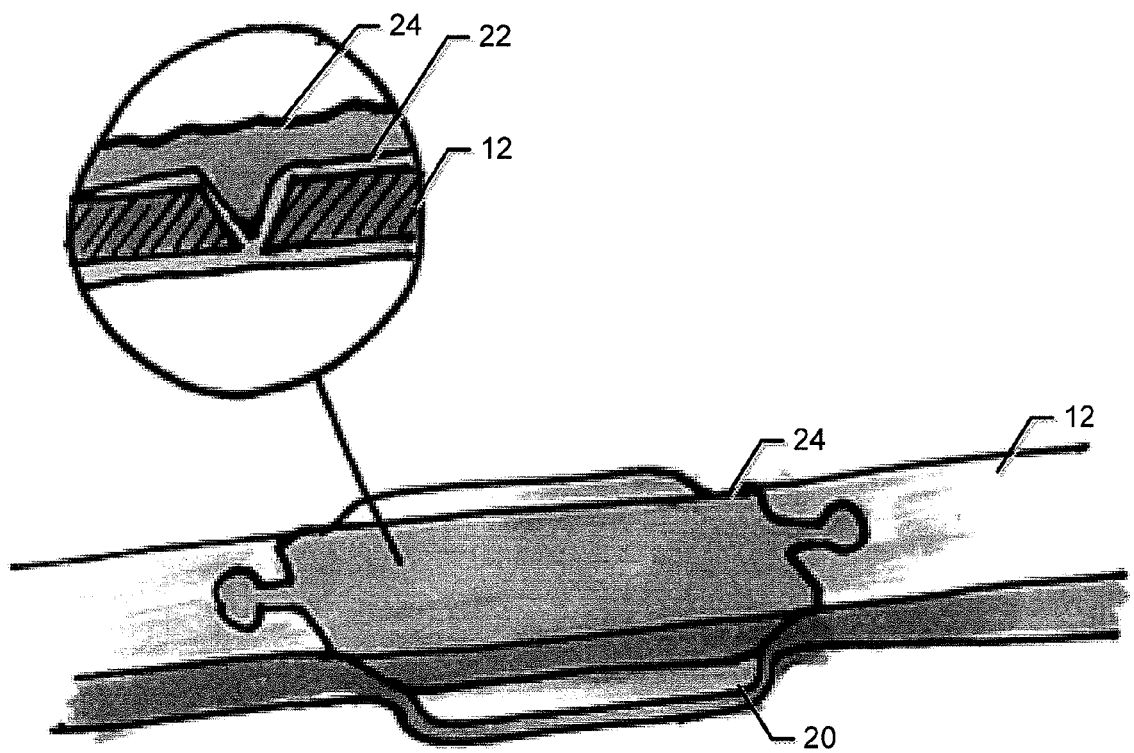
Figure 7:
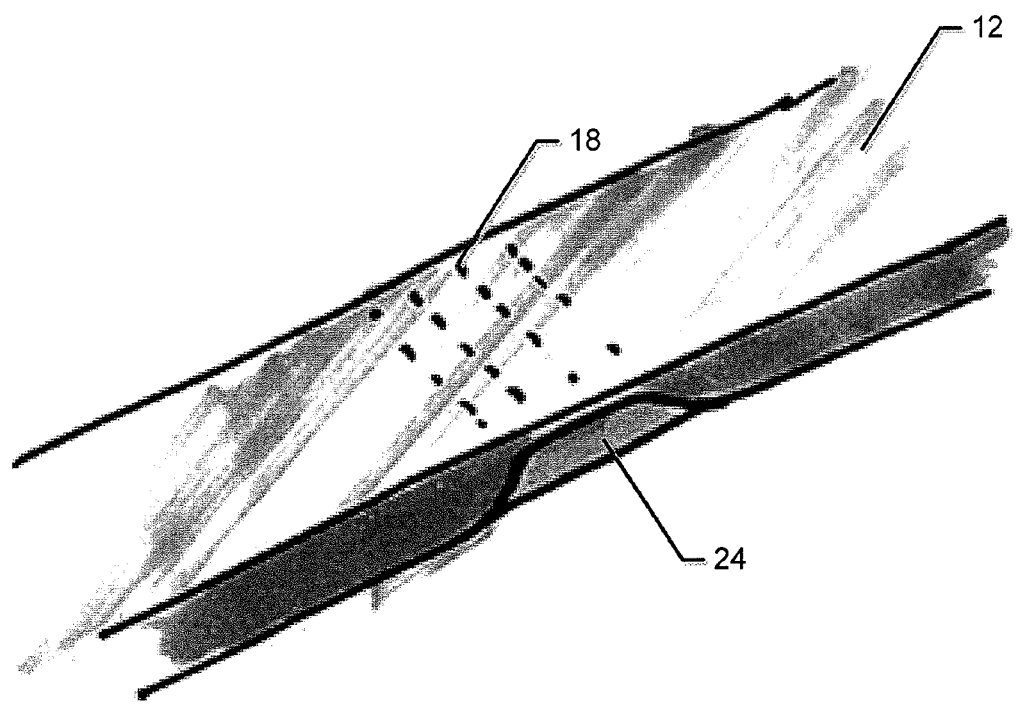
Figure 8:
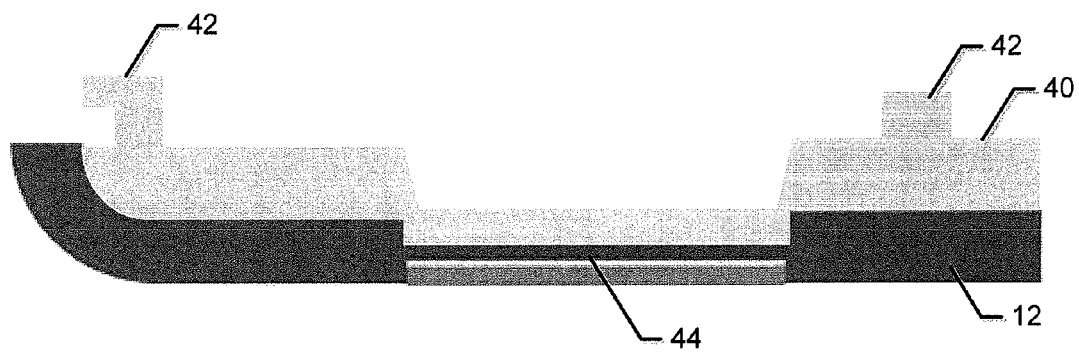
Figure 9:
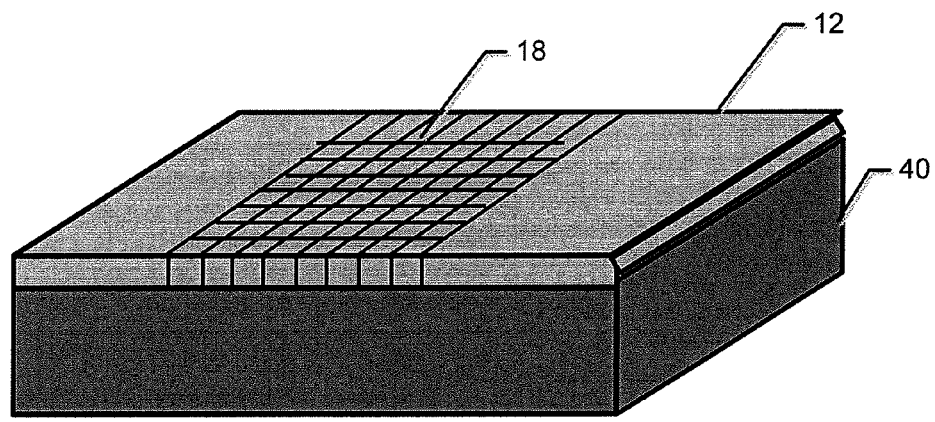
Figure 10:
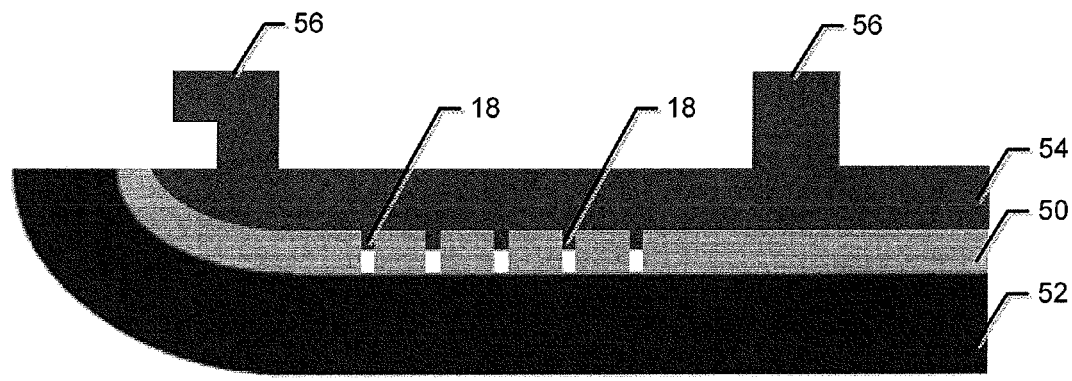
Figure 11:
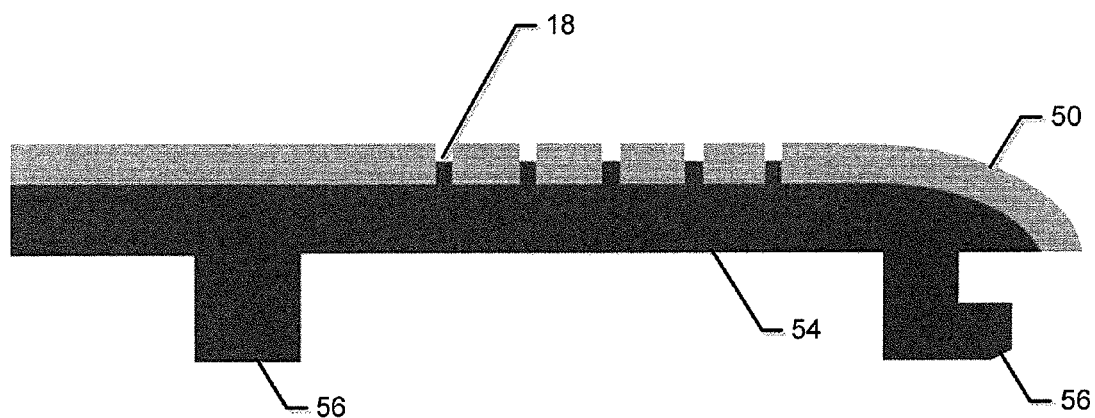
Figure 12:
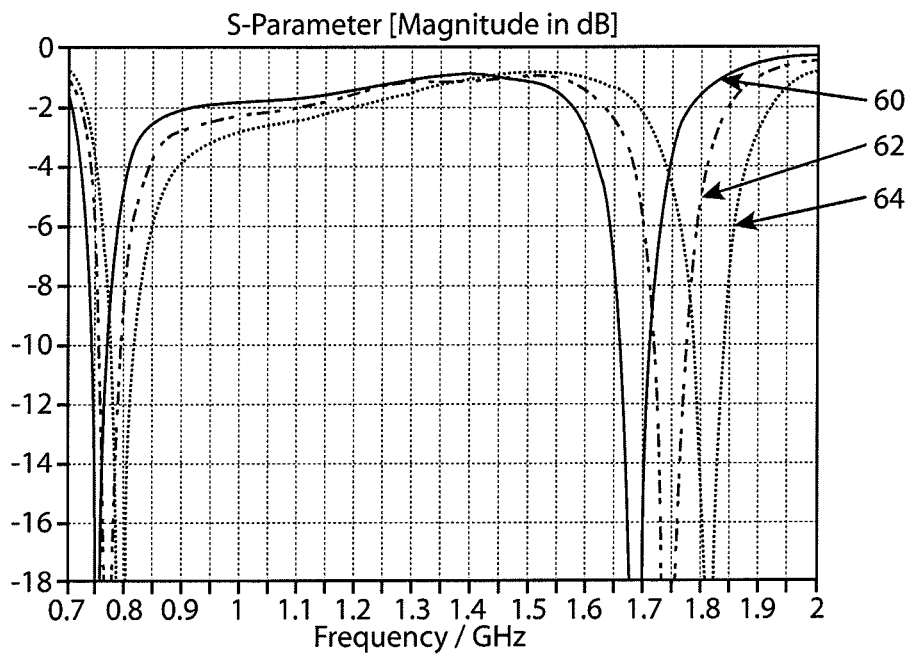
Figure 13:
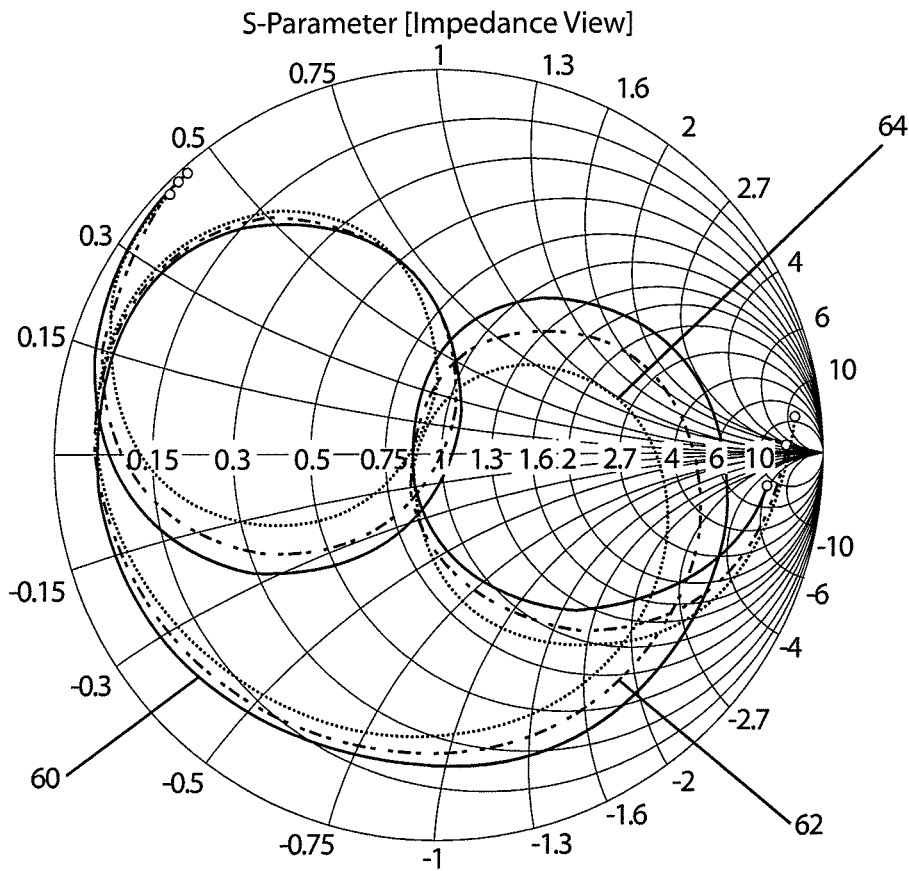
Figure 14:
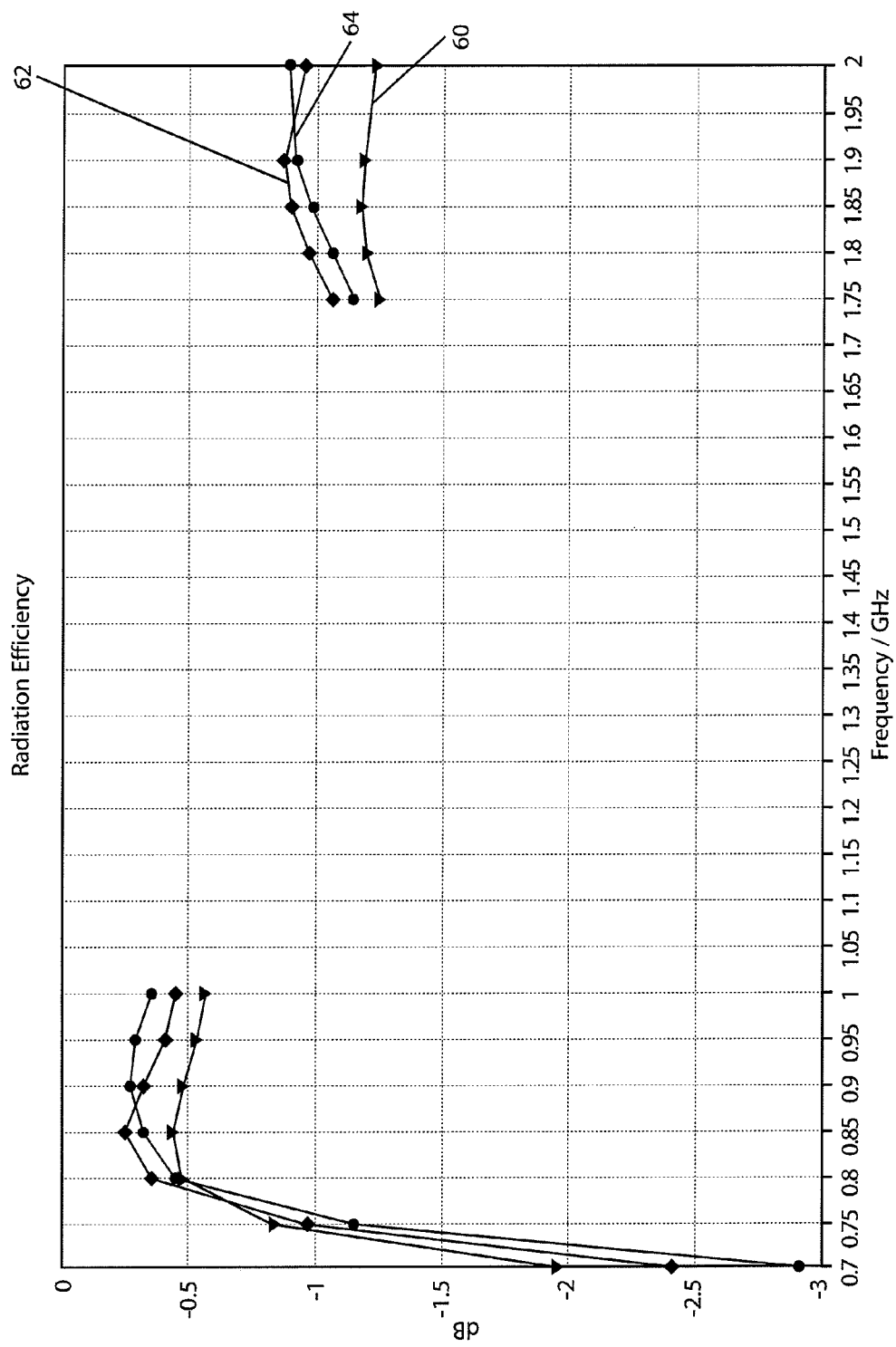

Having thus described certain example embodiments of the present invention in general terms, reference will hereinafter be made to the accompanying drawings, which are not necessarily drawn to scale, and wherein:

FIG. 1 is a perspective view of a portable electronic device that includes an antenna positioned within the housing and that may be fabricated in accordance with an example embodiment of the present invention;

FIG. 2 is a flowchart illustrating operations performed to fabricate a body of a portable electronic device in accordance with an example embodiment of the present invention;

FIGS. 3A-3C are schematic illustrations of a portable electronic device in accordance with three different example embodiments of the present invention;

FIG. 4 illustrates the formation of laser perforation apertures in accordance with an example embodiment of the present invention;

FIG. 5 illustrates the anodization of the conductive portion of the body of the portable electronic device including the at least partial filling of the laser perforation apertures in accordance with an example embodiment of the present invention;

FIG. 6 illustrates the overmolding of the laser perforation apertures in accordance with an example embodiment of the present invention;

FIG. 7 illustrates a portion of the resulting body of the portable electronic device following a removal of the flanges in accordance with an example embodiment of the present invention;

FIG. 8 is a side view of a portion of the body of a portable electronic device illustrating the formation of a plastic part on the conductive layer that defines one or more internal features in accordance with an example embodiment of the present invention;

FIG. 9 illustrates the definition of a mesh comprised of a plurality of apertures within the conductive layer by laser perforation in accordance with an example embodiment of the present invention;

FIG. 10 is a side view of a plastic part formed on a conductive layer opposite a plastic carrier with the plastic part at least partially filling the mesh defined by laser perforation in accordance with an example embodiment of the present invention;

FIG. 11 is a side view of the plastic part and the conductive layer of FIG. 10 following the removal of the plastic carrier in accordance with an example embodiment of the present invention;

FIG. 12 is a graphical representation of the return loss of antennas in accordance with two example embodiments of the present invention as a function of frequency;

FIG. 13 is a Smith chart that provides an impedance view of the return loss of FIG. 12; and FIG. 14 is a graphical representation of the radiation efficiency of antennas in a low band region and a high band region in accordance with two example embodiments of the present invention as a function of frequency.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Portable electronic devices, such as a mobile telephone, e.g., a cellular telephone, a smartphone or the like, a personal digital assistant (PDA), a laptop computer, a tablet computer, a navigation system, a music player, a game player, computer workstation or any of numerous other computation devices, content generation devices, content consumption devices or combinations thereof, generally include a body, such as a housing, that provides strength and rigidity so as to protect electronic circuitry disposed within the housing. The body of a portable electronic device may also be configured to have an attractive aesthetic appearance so as to be appealing to a user. As described below, the body of some portable electronic devices may be fabricated in a manner that permits RF signals to be transmitted to and from an antenna positioned within the housing.

By way of example, FIG. 1 illustrates a portable electronic device 10, such as a mobile telephone, PDA or the like, that includes a body 12, such as a housing, including a conductive portion and electronic circuitry 14, such as one or more processors, one or more memories, radio frequency circuitry, etc., disposed at least partially and, more typically, entirely within the body of the portable electronic device, as represented by the dashed lines in FIG. 1. The electronic circuitry disposed within the body of the portable electronic device of this embodiment may include an antenna arrangement 16 for transmitting and/or receiving signals, such as radio frequency (RF) signals. Although the antenna arrangement may be configured in various manners, the antenna arrangement of one embodiment includes an antenna element, e.g., a radiating element, extending from and coupled to the electronic circuitry, e.g., the radio frequency circuitry, at a first end thereof and a coupled arm or parasitic element which is coupled to a ground plane 17 at a first end thereof and coupled to the antenna element at least at a second end thereof. The ground plane is provided by a conductive portion disposed on at least one layer of a printed wiring board (PWB) 19. In other embodiments the ground plane may be provided by other conductive objects with the device in addition to the PWB or instead of the PWB, for example and not limited to, batteries, cells, shielding cans, conductive body parts, external conductive housings, conductive support structures for displays, additional conductive support structures, and so on. The antenna element is a fed antenna element, in other words the electronic circuitry is coupled to the antenna element with or without intervening components. In some embodiments the parasitic element may not be needed and only the fed antenna element may be required. Since the conductive portion of the body may attenuate or block the signals transmitted to and from the antenna, the body of the portable electronic device of this embodiment may include one or more laser perforation apertures 18 defined by the conductive portion of the body to permit the propagation of RF signals to and from the antenna. The laser perforation aperture(s) of an example embodiment may be positioned in alignment with a respective antenna, such as with the antenna element and/or the parasitic element. While the body of a portable electronic device may include a single set of laser perforation aperture(s), the body of a portable electronic device may include two or more sets of laser perforation aperture(s) defined by different portions of the body, such as by opposite sides of the body as shown in FIG. 1.

The laser perforation apertures 18 may have various configurations including, for example, at least one of a slot, a hole, a notch or a slit. Although illustrated by dashed lines in FIG. 1, the sets of laser perforation apertures 18 are generally not visible such that the body 12 of the portable electronic device 10 has a consistent aesthetic appearance, such as a consistent metallic appearance. However, the formation of the apertures by laser perforation facilitates transmission of RF signals to and from the antenna 16 that is disposed within the body of the portable electronic device, such as in alignment with the laser perforation apertures.

Referring now to FIG. 2, the operations performed in order to fabricate the body 12 of the portable electronic device 10 in accordance with an example embodiment of the present invention are illustrated with the body of the resulting portable electronic device having one or more perforation apertures 18 for supporting RF transmission. As shown in block 30 of FIG. 2, at least one aperture and, more typically, a plurality of apertures are defined by laser perforation through a conductive portion of the body of the portable electronic device. These apertures may be defined by laser perforation through various conductive portions of the body of the portable electronic device. In the embodiment illustrated in FIG. 1, however, a sidewall or bezel of the portable electronic device may include a conductive band or the like with the laser perforation apertures being defined therethrough. In the illustrated embodiment, for example, two sets of laser perforation apertures may be defined by different portions of the sidewall, such as on opposite sides of the housing. However, the portable electronic device of other embodiments may include any number of laser perforation apertures and any number of sets of laser perforation apertures. The conductive portion of the body of the portable electronic device may be formed of various metals including, for example, aluminum, or from other conductive materials, such as and not limited to graphite, carbon, conductive composite materials or the like. Additionally or alternatively, the conductive portion of the body may include a conductive layer, e.g., a metal layer, which is coated with plastic or a plastic layer that is coated or that otherwise carries a conductive layer, e.g., a metal layer.

The conductive sidewall of the body 12 may be separated into at least two portions by the first and second laser perforation apertures 18, which are physically displaced from one another as shown in FIG. 1. For example, the conductive sidewall of the embodiment of FIG. 1 is separated into a first portion 13 and a second portion 15 by the laser perforation apertures. In one example embodiment, one portion of the conductive sidewall may be coupled, such as galvanically or electromagnetically coupled, directly to the electronic circuitry 14, e.g., the radio frequency circuitry. In this embodiment, the portion of the conductive sidewall that is coupled to the electronic circuitry defines at least a portion of the radiating element of the antenna arrangement 16. In another example embodiment, one portion of the conductive sidewall may be coupled, such as galvanically or electromagnetically coupled, directly to the ground plane 17. In this embodiment, the portion of the conductive sidewall that is coupled to the ground plane defines at least a portion of the parasitic element of the antenna arrangement. In yet another embodiment, one of the first and second portions of the conductive sidewall may be coupled to the electronic circuitry so as to define at least a portion of the radiating element of the antenna arrangement, while the other of the first and second portions of the conductive sidewall may be coupled to the ground plane so as to define at least a portion of the parasitic element of the antenna arrangement.

By way of example, reference is now made to FIGS. 3A-3C which illustrate various manners in which the portion of the conductive sidewall that has been separated from other portions of the conductive sidewalls by the laser perforation apertures 18 is utilized as part of the antenna arrangement 16. With respect to the embodiment of FIG. 3A, the first portion 13 of the conductive sidewall may be either electrically floating, such as by not being coupled to any electrical potential, or may optionally be grounded at one or more locations as shown. The antenna arrangement positioned within the body 12 of the portable electronic device may include a radiating element and optionally a parasitic element with the radiation propagating to and/or from the antenna arrangement passing through the laser perforation apertures. As shown, the second portion 15 of the conductive sidewall may optionally be coupled at one or more locations to ground or, alternatively, remain electrically floating.

In an embodiment the radiating element may have a first electrical length configured to resonate at least at a first resonant frequency, and the optional internal parasitic element may have a second electrical length configured to resonate at least at a second resonant frequency, the second resonant frequency being different than the first resonant frequency. The first portion 13 of the conductive sidewall may, in an embodiment, have a third electrical length configured to resonate at least at a third resonant frequency, the third resonant frequency being different than the first and/or second resonant frequency. The first portion 13 of the conductive sidewall may be a further optional parasitic element configured to couple to the radiating element and/or the optional internal parasitic element. When the first portion 13 of the conductive sidewall is configured to have a third electrical length that falls within the frequency band(s) at which the radiating element and/or the optional internal parasitic element operate, radio frequencies radiated by the radiating element and the optional internal parasitic element will couple to/from the first portion 13 of the conductive sidewall for further radiation to/from the ether at the same time as radio frequencies passing through the laser perforation apertures 18. As such, the first portion 13 of the conductive sidewall of this embodiment may serve as a parasitic element so as to potentially widen the bandwidth of the overall antenna arrangement, while appearing from outside of the portable electronic device as a continuous conductive structure notwithstanding the laser perforation apertures 18. In an alternative embodiment in which the first portion 13 of the conductive sidewall has an electrical length which is configured to resonate at a third resonant frequency which is substantially different than the first and/or second resonant frequency, the first portion 13 of the conductive sidewall can be considered to be operating outside of the operational frequency band(s) in which the radiating element and/or the optional internal parasitic element operate. As such, the first portion 13 of the conductive sidewall of this embodiment may appear almost transparent at the operational frequency band(s).

In the example embodiment of FIG. 3B, the first portion 13 of the conductive sidewall may be a portion of a radiating element of the antenna arrangement 16 by being coupled to the radiating element. The first portion of the conductive sidewall may also be optionally grounded, such as at a position spaced apart from the position at which the first portion is coupled to the radiating element. The laser perforation apertures 18 of this embodiment therefore serve to electrically separate or isolate the first portion 13 of the conductive sidewall from other portions of the conductive sidewall, while permitting the body 12 to appear seamlessly conductive as described herein. As shown, the second portion 15 of the conductive sidewall may optionally be coupled at one or more locations to ground or, alternatively, remain electrically floating.

In regards to the example embodiment of FIG. 3C, the first portion 13 of the conductive sidewall may be a portion of a parasitic element of the antenna arrangement 16 by being grounded, such as by being coupled at one end to the parasitic antenna element. In an instance in which the parasitic element is to have its distal end left open with no ground connection, the opposite end of the first portion of the conductive sidewall may also be left open, e.g., ungrounded. However, if the parasitic element is of a loop antenna type of construction, the first portion of the conductive sidewall may also be coupled to ground at one or more other locations, such as proximate the opposite end of the first portion as shown in FIG. 3C. The antenna arrangement of this embodiment also includes a radiating element. The laser perforation apertures 18 of this embodiment therefore serve to electrically separate or isolate the first portion 13 of the conductive sidewall from other portions of the conductive sidewall, while permitting the body 12 to appear seamlessly conductive as described herein. The second portion 15 of the conductive sidewall may again optionally be coupled at one or more locations to ground or, alternatively, remain electrically floating.

As shown in FIG. 4 in which a laser beam 21 is impinging upon the conductive portion of the body 12, the apertures 18 that are defined by laser perforation may extend across the conductive portion of the body 12 of the portable electronic device 10 in a generally parallel configuration. In one embodiment, the portion of the body of the portable electronic device in which the slots are defined by laser perforation may be recessed and, as such, may be thinner than other portions of the body of the portable electronic device. In addition, the conductive portion of the body of the portable electronic device may include at least one and, more typically, a pair of flanges 20 extending laterally outward. Thus, the apertures defined by laser perforation may extend across the conductive portion of the body of the portable electronic device up to the flanges and, in some instances, into the flanges. However, the apertures defined by laser perforation of one embodiment do not extend completely through the flanges so as to not physically separate the conductive portion of the body of the portable electronic device.

In one embodiment, the apertures 18 defined by laser perforation have a generally truncated V-shape with tapered sidewalls and an opening proximate one surface of the conductive portion of the body 12 of the portable electronic device 10 that is wider than the opening proximate the other surface of the conductive portion. As such, the apertures may extend through the thickness of the conductive portion of the body of the portable electronic device. While the conductive portion may have various thicknesses, the conductive portion of one embodiment has a thickness of about 0.3 mm such that the apertures also have a depth of about 0.3 mm. The laser perforation apertures may be defined to have various sizes and shapes including, for example, apertures having widths of a few micrometers, as well as larger apertures. In one embodiment, however, each set of laser perforation apertures may include 10-12 slots with each slot having a width (determined on the smaller side of the opening) between 0.03 mm and 0.1 mm and with the slots being evenly spaced across a section of the conductive portion of the body of the portable electronic device that is about 2 mm in width. In the embodiment in which the slots have a width of 0.03 mm, the slots may have a center-to-center spacing of about 0.15 mm in one embodiment.

As shown in block 32 of FIG. 2 and in FIG. 5, the metallic portion of the body 12 of the portable electronic device 10 may then be anodized so as to form an anodization layer 22. The anodization layer may be formed of various materials, but is typically formed of a metal oxide, such as aluminum oxide. In accordance with an example embodiment of the present invention, the anodization layer at least partially fills the laser perforation apertures 18. Although the laser perforation apertures may be completely filled by the anodization layer, the anodization layer of some embodiments may fill only a portion of the laser perforation apertures. However, at least the portion of the aperture that opens to the exterior surface of the conductive portion of the body of the portable electronic device may be filled with the anodization layer, such that the anodization layer appears to continuously cover the body of the portable electronic device when viewed from the exterior of the portable electronic device.

The laser perforation apertures 18 of one embodiment may then be overmolded, such as with a plastic, a resin or an adhesive. See block 34 of FIG. 2 and also FIG. 6. In this regard, the interior surface of the conductive portion of the body 12 of the portable electronic device 10, that is, the surface of the conductive portion of the body of the portable electronic device opposite the surface of the conductive portion of the body of the portable electronic device that was anodized may be overmolded so as to fill the laser perforation apertures to the extent that the laser perforation apertures were not previously filled by the anodization layer 22. After the overmolded material 24, such as the plastic, resin or adhesive, has cured, the conductive portion of the body of the portable electronic device may be finished by removing the flanges 20 as shown in block 36 of FIG. 2. While the flanges may be removed in various manners, the flanges of one embodiment may be removed by machining or otherwise mechanically abrading the flanges. Additionally, the overmolded material 24 may be machined, such as by grinding, polishing or the like, such that the resulting overmolded material is flush with the remainder of the inner surface of the conductive portion of the body of the portable electronic device. See FIG. 7.

The resulting conductive portion of the body 12 of the portable electronic device 10 includes at least one and, in some embodiments, a plurality of laser perforation apertures 18 that may facilitate the transmission of RF signals to and from an antenna arrangement 16 disposed within the body of the portable electronic device. However, the conductive portion of the body of the portable electronic device is fabricated in a manner such that the laser perforation apertures are not visible from the exterior of the portable electronic device and, instead, the exterior surface of the conductive portion of the body of the portable electronic device has a consistent metallic appearance attributable to the anodization of the conductive portion which at least partially fills the laser perforation apertures with the anodization layer 22. Consequently, the body of the portable electronic device is both aesthetically attractive as a result of its consistent metallic appearance, while still providing for RF transparency with respect to antennas disposed within the portable electronic device.

As shown in FIG. 6, the overmolded material 24 may effectively fill a recessed portion within which the laser perforation apertures 18 are defined. However, the overmolded material may, instead, form a plastic part 40 on the interior of the conductive layer, opposite the anodization layer 22, which defines one or more internal features 42, such as one or more molded screw towers, one or more snaps, etc. In this regard, FIG. 8 illustrates a conductive portion, such as an aluminum part, that will form a portion of the body 12 of a portable electronic device 10 that includes a recessed portion in which one or more laser perforation apertures will be defined. The body of the portable electronic device in this embodiment also includes a plastic part formed on the conductive portion of the body of the portable electronic device. In this regard, the plastic part may be formed of various different types of plastic materials that may withstand anodization including, for example, a polycarbonate (PC), polybutylene teraphthalate (PBT), polyphenylene sulfide (PPS), a polyamide (PA), polyetheretherketone (PEEK), polyaryletherketone (PAEK), etc. In one embodiment, a layer of adhesive or resin 44 may be disposed on an interior surface of the conductive portion of the body of the portable electronic device so as to secure the plastic part to the conductive portion. The laser perforation apertures may then be defined.

As shown, for example, in FIG. 9, the definition of at least one aperture 18 by laser perforation may include the definition of a mesh comprised of a plurality of slots formed by laser perforation through the conductive portion. The laser perforation slots that comprise the mesh may include two sets of slots, each set including a plurality of slots that extend parallel to one another, but with each set of slots positioned orthogonal to the other set of slots. The exterior surface of the conductive portion of the body of the portable electronic device may then be anodized with the resulting anodization layer 22 at least partially filling the plurality of laser perforation slots that comprise the mesh. As such, the resulting body of the portable electronic device facilitates the transmission of radio frequency signals to and from an antenna arrangement 16 disposed within the body of the portable electronic device, while permitting the body of the portable electronic device to include one or more internal features, such as defined by the plastic part 40 that is formed within and adhered to the conductive portion of the body of the portable electronic device.

In another embodiment depicted in FIGS. 10 and 11, the conductive portion of the body 12 of the portable electronic device 10 may include a conductive layer 50 supported by a plastic carrier 52 from the final outer side surface (opposite the final back side). The conductive layer may be of one embodiment may be anodized with an anodization layer formed thereupon. While the conductive layer is supported by the plastic carrier, one or more apertures 18 may be defined through the conductive layer by laser perforation from the final backside, such as by defining a mesh comprised of a plurality of apertures within the conductive layer by laser perforation as shown, for example, in FIG. 9. A plastic part 54 may then be formed on the conductive layer opposite the plastic carrier, such that the plastic part at least partially fills the mesh, as shown, for example, in FIG. 10. As also shown in FIG. 10, the plastic part may define one or more internal features 56 of the portable electronic device, such as one or more molded screw towers, one or more snaps or the like. After forming the plastic part, the plastic carrier may be removed, such that the resulting body of the portable electronic device is fabricated as shown in FIG. 11. In an instance in which the conductive layer was not previously anodized, the external surface of the conductive layer, that is, the final outer side surface of the conductive layer, may then be anodized to form an anodization layer 22 that at least partially fills the laser perforation apertures, such as by filling that portion of the laser perforation apertures that was not previously filled by the plastic part. The plastic carrier may be removed in various manners, including being dissolved in an alcohol such as methanol. In this embodiment, the plastic part may be formed of a different plastic than the plastic carrier with the plastic part being formed of a plastic material that has increased chemical resistance to alcohol relative to the plastic carrier. For example, the plastic part may be formed of polymethyl methacrylate (PMMA), while the plastic carrier may be formed of PA.

As described above, the resulting body 12 of the portable electronic device 10 has a consistent metallic appearance, but includes one or more laser perforation apertures 18 for facilitating the transmission of radio frequency signals to and from an antenna 16 disposed within and, in one embodiment, aligned with the laser perforation apertures.

By way of example of advantages offered by example embodiments of the present invention, FIGS. 12 and 13 are graphical representations of the S-parameter responses of the antennas 16 of two example embodiments of the present invention, which illustrate the manner in which the antennas are impedance matched versus frequency. FIG. 12 illustrates the magnitude of the return loss in dB as a function of frequency in GHz, while FIG. 13 is a Smith chart that provides an impedance view of the return loss of the same antennas. Additionally, FIG. 14 depicts the radiation efficiency of the same antennas as in FIGS. 12 and 13 in a low band region and a high band region. In this regard, the radiation efficiency in dB is presented as a function of frequency in GHz. The curve designated as 60 in FIGS. 12-14 is representative of the return loss or radiation efficiency associated with an embodiment in which a pair of laser perforation apertures are filled with a material, such as plastic, having a low loss and a low dielectric constant. In this regard, low loss relates to low loss to RF, represented by tan δ. Additionally, low dielectric constant $\in_r$ is considered low for an antenna if less than a predefined value, such as 5. Additionally, the curve designated as 62 is representative of the return loss or radiation efficiency associated with an embodiment in which the pair of laser perforation apertures are unfilled, e.g., are filled with air ($\in_r$=1). As will be noted, the loading is higher for an embodiment in which the laser perforation apertures 18 are filled with the low loss dielectric material than in an embodiment in which the laser perforation aperatures are filled with air, so the resonant frequency, particularly in the high band, e.g., approximately 1800 MHz, is loaded, that is, tuned down in frequency more with low loss material than for air. Curves 60 and 62 may be compared with curve 64 representative of the more pronounced return loss associated with a body of a portable electronic device that does not include laser perforation apertures.

In some example embodiments, certain ones of the operations described in conjunction with FIG. 2 may be modified or further amplified as described below. Moreover, in some embodiments additional optional operations may also be included. As one example, the apertures defined within the conductive portion of the body 12 of other embodiments may be formed by techniques other than through use of a laser. As another example, the anodization of the conductive portion may occur prior to the laser perforation of the conductive portion in some embodiments. It should be appreciated that each of the modifications, optional additions or amplifications may be included with the operations described above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, while primarily described above in regards to laser perforation apertures 18 defined by a sidewall or bezel of a portable electronic device 10, other conductive portions of the body 12 of the portable electronic device may define the laser perforation apertures. In this regard, any portion of the body including any or all surfaces of the portable electronic device may define the laser perforation apertures. In one example embodiment, the body of a portable electronic device may be fabricated of a conductive, e.g., metal, material so as to have the appearance of a unibody, but may define one or more laser perforation apertures to create isolated islands of conductive material or conductive portions. These isolated islands may be utilized as floating electrical elements, e.g., parasitic antenna elements, or as fed antenna elements. In this embodiment that includes one or more isolated islands, one, some or all of the isolated islands may be utilized as radiators for distinct frequency bands or for the same frequency band, e.g., as array elements. Alternatively, the laser perforation apertures that separate the isolated islands of the body may allow radiation to propagate to and/or from an internal antenna, as described above. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   defining at least one aperture by laser perforation through a conductive portion of a body of a portable electronic device; and
   anodizing the conductive portion including at least partially filling the at least one aperture with an anodization layer, wherein at least partially filling the at least one aperture with an anodization layer comprises filling at least the portion of the at least one aperture that opens through a surface of the conductive portion such that the anodization layer appears to continuously cover the surface of the conductive portion,
   wherein the at least one aperture is defined so as to extend completely through the conductive portion of the body of the portable electronic device prior to anodizing the conductive portion.

2. A method according to claim 1 wherein defining the at least one aperture by laser perforation comprises defining the at least one aperture at a location in alignment with an antenna arrangement of the portable electronic device.

3. A method according to claim 1 wherein defining the at least one aperture by laser perforation comprises defining a plurality of apertures.

4. A method according to claim 1 further comprising overmolding the at least one aperture with at least one of plastic, resin or adhesive so as to fill the at least one aperture following the anodizing.

5. A method according to claim 1 wherein the conductive portion of the body of the portable electronic device comprises at least one flange, and wherein the method further comprises removing the at least one flange following the anodizing.

6. A method according to claim 1 wherein the conductive portion of the body of the portable electronic device comprises a conductive layer supported by a plastic carrier, and wherein defining the at least one aperture by laser perforation comprises defining a mesh comprised of a plurality of apertures within the conductive layer by laser perforation.

7. A method according to claim 6 further comprising:
forming a plastic part on the conductive layer opposite the plastic carrier such that the plastic part at least partially fills the mesh; and
removing the plastic carrier following formation of the plastic part.

8. A method according to claim 1 wherein defining the aperture comprises defining at least one of a slot, slit, hole or notch.

9. A method according to claim 1 wherein the conductive portion comprises a metal portion.

10. A body of an apparatus comprising:
a conductive portion having at least one laser perforation aperture defined therein; and
an anodization layer that at least partially fills the at least one laser perforation aperture, wherein the anodization layer fills at least the portion of the at least one laser perforation aperture that opens through a surface of the conductive portion such that the anodization layer appears to continuously cover the surface of the conductive portion,
wherein the at least one laser perforation aperture is defined so as to extend completely through the conductive portion prior to at least partially filling the at least one laser perforation aperture with the anodization layer.

11. A body of an apparatus according to claim 10 wherein the at least one laser perforation aperture is in alignment with an antenna of the portable electronic device.

12. A body of an apparatus according to claim 10 wherein the conductive portion defines a plurality of laser perforation apertures.

13. A body of an apparatus according to claim 10 further comprising an overmolded material on the conductive portion opposite the anodization layer that fills the at least one aperture, wherein the overmolded material comprises a plastic, resin or adhesive.

14. A body of an apparatus according to claim 10 wherein the conductive portion comprises at least one flange extending beyond the at least one laser perforation aperture.

15. A body of an apparatus according to claim 10 further comprising a plastic carrier, wherein the conductive portion comprises a conductive layer supported by the plastic carrier and defining a mesh comprised of a plurality of laser perforation apertures.

16. A body of an apparatus according to claim 15 further comprising a plastic part on the conductive layer opposite the plastic carrier such that the plastic part at least partially fills the mesh.

17. A portable electronic device comprising the body of the apparatus as set forth by claim 10.

18. A portable electronic device comprising:
at least a portion of a housing comprising a conductive portion having at least one aperture defined therein and an anodization layer that at least partially fills the at least one aperture; and
electronic circuitry including an antenna disposed at least partially within the housing,
wherein the at least one aperture is in alignment with the antenna.

19. A portable electronic device according to claim 18 wherein the conductive portion defines a plurality of laser perforation apertures which separate the conductive portion into at least two portions.

20. A portable electronic device according to claim 19 wherein the antenna comprises a radiating element and a ground plane, and wherein one portion of the conductive portion defines at least a portion of the radiating element.

21. A portable electronic device according to claim 20 wherein the electronic circuitry comprises radio frequency circuitry, and wherein the radiating element comprises a fed antenna element coupled to the radio frequency circuitry.

22. A portable electronic device according to claim 19 wherein the antenna comprises a radiating element and a ground plane, and wherein one portion of the conductive portion defines at least a portion of the ground plane.

23. A portable electronic device according to claim 22 wherein the one portion of the conductive portion defines at least a portion of a parasitic element, and wherein the parasitic element is coupled to the ground plane.

24. A portable electronic device according to claim 18 wherein the housing further comprises an overmolded material on the conductive portion opposite the anodization layer that fills the at least one aperture, wherein the overmolded material comprises a plastic, resin or adhesive.

25. A portable electronic device according to claim 24 wherein the overmolded material comprises a plastic material and defines one or more internal features.

* * * * *